(12) United States Patent
Carbajal et al.

(10) Patent No.: US 12,065,551 B2
(45) Date of Patent: Aug. 20, 2024

(54) CONSOLIDATED POLYMER FILM

(71) Applicant: DUPONT ELECTRONICS, INC., Wilmington, DE (US)

(72) Inventors: Leopoldo Alejandro Carbajal, Newark, DE (US); Mark Allan Lamontia, Landenberg, PA (US); Ross S Johnson, Wilmington, DE (US); Kostantinos Kourtakis, Media, PA (US); Aref Samadidooki, Wilmington, DE (US); Mobin Yahyazadehfar, Garnet Valley, PA (US); Heidi Elizabeth Burch, Bear, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 331 days.

(21) Appl. No.: 17/493,319

(22) Filed: Oct. 4, 2021

(65) Prior Publication Data

US 2022/0106451 A1    Apr. 7, 2022

Related U.S. Application Data

(60) Provisional application No. 63/087,572, filed on Oct. 5, 2020.

(51) Int. Cl.
| | | |
|---|---|---|
| *B32B 27/28* | (2006.01) | |
| *B29C 65/00* | (2006.01) | |
| *B29K 79/00* | (2006.01) | |
| *B32B 3/02* | (2006.01) | |
| *C08J 5/18* | (2006.01) | |
| *C08J 7/04* | (2020.01) | |

(52) U.S. Cl.
CPC ............... *C08J 5/18* (2013.01); *B29C 66/43* (2013.01); *B29C 66/712* (2013.01); *B32B 3/02* (2013.01); *B32B 27/281* (2013.01); *C08J 7/042* (2013.01); *B29C 66/7315* (2013.01); *B29C 66/73365* (2013.01); *B29C 66/7394* (2013.01); *B29K 2079/08* (2013.01); *B29K 2079/085* (2013.01); *B32B 2250/24* (2013.01); *B32B 2307/412* (2013.01); *B32B 2307/51* (2013.01); *B32B 2307/54* (2013.01); *B32B 2457/20* (2013.01); *C08J 2379/08* (2013.01); *Y10T 428/192* (2015.01)

(58) Field of Classification Search
CPC .......... C08J 5/18; C08J 7/042; C08J 2379/08; B29C 66/43; B29C 66/712; B29C 66/7315; B29C 66/73365; B29C 66/7394; B32B 3/02; B32B 27/281; B32B 2250/24; B32B 2307/412; B32B 2307/51; B32B 2307/54; B32B 2457/20; B32B 27/08; B32B 27/20; B32B 27/286; B32B 27/302; B32B 27/325; B32B 27/34; B32B 27/36; B32B 27/365; B32B 2307/402; B32B 2307/558; B32B 2307/732; B32B 27/308; B32B 27/00; B29K 2079/08; B29K 2079/085; Y10T 428/192

See application file for complete search history.

(56) References Cited

U.S. PATENT DOCUMENTS

| | | | |
|---|---|---|---|
| 2,801,185 A | 7/1957 | Iler | |
| 4,522,958 A | 6/1985 | Das et al. | |
| 5,648,407 A | 7/1997 | Goetz et al. | |
| 7,285,321 B2 | 10/2007 | Kanakarajan et al. | |
| 2008/0138537 A1 | 6/2008 | Simone et al. | |
| 2008/0264561 A1* | 10/2008 | Laue | B29C 66/71 |
| | | | 156/308.4 |
| 2012/0061011 A1* | 3/2012 | Laue | C08G 73/1067 |
| | | | 156/308.2 |
| 2015/0118462 A1 | 4/2015 | Hwang et al. | |
| 2015/0147532 A1 | 5/2015 | Nam et al. | |
| 2015/0183932 A1 | 7/2015 | Katayama et al. | |
| 2016/0048171 A1 | 2/2016 | Lee et al. | |
| 2016/0101593 A1 | 4/2016 | Nam et al. | |
| 2016/0137789 A1 | 5/2016 | Suenaga et al. | |
| 2018/0088392 A1 | 3/2018 | Park et al. | |

FOREIGN PATENT DOCUMENTS

| | | |
|---|---|---|
| JP | 4031624 B2 | 1/2008 |
| JP | 4406921 B2 | 2/2010 |
| JP | 2014-019108 A | 2/2014 |
| WO | 2018/186262 A1 | 10/2018 |
| WO | 2020/102280 A1 | 5/2020 |

OTHER PUBLICATIONS

Srinivas, macromolecules 1997, 30, 1012-1022.*
Dupont Kapton "Polyimide Film Safety in Handling and Use" datasheet. 3 pages. (Year: 2020).*
Nexolve CP1 Polyimide datasheet. 2 pages. (Year: 2019).*
PCT International Search Report for Application No. PCT/US2019/061076; Sze Man Yu (Authorized Officer); ISA/EPO; Feb. 12, 2020.
PCT International Search Report for Application No. PCT/US2019/061086; Sze Man Yu (Authorized Officer); ISA/EPO; Feb. 13, 2020.

* cited by examiner

*Primary Examiner* — John D Freeman

(57) ABSTRACT

In a first aspect, a consolidated polymer film includes a first polymer layer having a first elastic modulus, wherein the first polymer layer comprises a non-melt-processible polymer comprising a polyimide, a poly(amide-imide), a block copolymer of a polyimide or a poly(amide-imide) or a mixture thereof, and a second polymer layer having a second elastic modulus, wherein the second polymer layer comprises a polyimide, a poly(amide-imide), a block copolymer of a polyimide or a poly(amide-imide) or a mixture thereof. A minor surface of the first polymer layer is in contact with a minor surface of the second polymer layer. The first elastic modulus is different from the second elastic modulus. The first and second polymer layers are bonded by consolidation.

15 Claims, No Drawings

CONSOLIDATED POLYMER FILM

FIELD OF THE DISCLOSURE

The field of this disclosure is consolidated polymer films, cover windows and electronic devices.

BACKGROUND OF THE DISCLOSURE

There is increasing interest in creating foldable OLE© displays to be used in an array of electronic devices, such as foldable smart phones, small tablets, rollable phones, laptops, rollable televisions and other large display formats, and for singly- and doubly-curved displays for automotive instrument panels and appliance control panels. Typical optical display cover windows include a stack of polymer layers, with individual stack layers providing different functions, such as impact resistance, scratch resistance and bending flexibility. Often, several stack layers are bonded together with adhesives. The adhesive interfaces are susceptible to mechanical failures, particularly adhesive failures or adhesive interface delamination as a result of inadequate interfacial adhesive strength and toughness, CTE or modulus mismatches between the bonded layers, mismatches in properties between the polymer layers and the adhesives, and susceptibility to unusual loadings like shocks, transverse punch or impact, creep, shear, wave reflection and refraction, and crack propagation. Furthermore, adhesive interfaces are complex to manufacture, requiring careful measures to assure that defects from manufacturing do not exacerbate the bonded joint quality and, thus, the loading difficulties cited above. Finally, adhesively bonded layers must withstand environmental attack by a range of temperatures, high humidity and moisture, and common chemicals encountered during use of a display device.

In addition to optical and flexibility requirements, a cover window must provide protection against impacts. Impact threats impart wave energy to the cover window and its interfaces. As the impact energy increases, the display could suffer damage, and at worst, the impact can damage the underlying optical components and render the display useless. Adhesive layers that allow the display to be flexible can diminish the ability to resist impacts by failing at the interfaces in tension and shear. Also, transverse puncture and pencil hardness loads benefit from a stiff cover window. Cover window constructions containing many adhesive layers lessen the ability to resist those loads since adhesive compliance leads to excessive unwanted deformation and strain. Finally, the display must reopen flat after being closed for short or long time periods, and over a range of temperatures. But optically clear adhesives suffer from creep and stress relaxation, two time-dependent material responses. Cover windows featuring multiple adhesive layers suffer since creep and stress relaxation occur when closing, endangering full reopening.

US Patent Application No. 2015/0118462 A1 describes a method for manufacturing a composite film for use in rollable and bendable display devices. The composite film includes elastic and non-elastic film portions and is formed by melt-extrusion of solid polymer resins and the different portions of the film may be adhered to each other without the use of adhesives. While useful for polymer resins that can melt and flow, such as polypropylenes and polyamides, this method is generally not used for typical polyimide resins that don't form a melt at desirable processing temperatures.

A film construction and film formation process that can overcome these challenges described above will be important for flexible displays for portable electronics.

SUMMARY

In a first aspect, a consolidated polymer film includes a first polymer layer having a first elastic modulus, wherein the first polymer layer includes a non-melt-processible polymer including a polyimide, a poly(amide-imide), a block copolymer of a polyimide or a poly(amide-imide) or a mixture thereof, and a second polymer layer having a second elastic modulus, wherein the second polymer layer comprises a polyimide, a poly(amide-imide), a block copolymer of a polyimide or a poly(amide-imide) or a mixture thereof. A minor surface of the first polymer layer is in contact with a minor surface of the second polymer layer. The first elastic modulus is different from the second elastic modulus. The first and second polymer layers are bonded by consolidation.

In a second aspect, a cover window includes the consolidated polymer film of the first aspect and a layer of a transparent material, wherein the layer of a transparent material has a speed of sound of at least 2000 m/s.

In a third aspect, an electronic device includes the cover window of the second aspect.

In a fourth aspect, a consolidated polymer film includes a first polymer layer having a first yield strength, wherein the first polymer layer includes a non-melt-processible polymer including a polyimide, a poly(amide-imide), a block copolymer of a polyimide or a poly(amide-imide) or a mixture thereof, and a second polymer layer having a second yield strength, wherein the second polymer layer includes a polyimide, a poly(amide-imide), a block copolymer of a polyimide or a poly(amide-imide) or a mixture thereof. The first yield strength is different from the second yield strength and the first and second polymer layers are bonded by consolidation.

In a fifth aspect, a cover window includes the consolidated polymer film of the fourth aspect and a layer of a transparent material, wherein the layer of a transparent material has a speed of sound of at least 2000 m/s.

In a sixth aspect, an electronic device includes the cover window of fifth aspect.

The foregoing general description and the following detailed description are exemplary and explanatory only and are not restrictive of the invention, as defined in the appended claims.

DETAILED DESCRIPTION

In a first aspect, a consolidated polymer film includes a first polymer layer having a first elastic modulus, wherein the first polymer layer includes a non-melt-processible polymer including a polyimide, a poly(amide-imide), a block copolymer of a polyimide or a poly(amide-imide) or a mixture thereof, and a second polymer layer having a second elastic modulus, wherein the second polymer layer comprises a polyimide, a poly(amide-imide), a block copolymer of a polyimide or a poly(amide-imide) or a mixture thereof. A minor surface of the first polymer layer is in contact with a minor surface of the second polymer layer. The first elastic modulus is different from the second elastic modulus. The first and second polymer layers are bonded by consolidation.

In one embodiment of the first aspect, the first and second polymer layers are substantially transparent. In a specific embodiment, the consolidated polymer film has a b* color of 2 or less for a film thickness of 50 μm or less.

In another embodiment of the first aspect, a Mode I interlaminar fracture toughness ($G_{Ic}$) between the first and second polymer layers is at least 500 J/m².

In still another embodiment of the first aspect, the elastic modulus of the first polymer layer is in a range of from 2 to 11 GPa.

In yet another embodiment of the first aspect, a difference between the elastic moduli of the first and second polymer layers is at least 5%.

In still yet another embodiment of the first aspect, the first polymer layer, the second polymer layer, or both the first and second polymer layers have a speed of sound of at least 1300 m/s.

In a further embodiment of the first aspect, the first polymer layer, the second polymer layer, or both the first and second polymer layers further include sub-micron fillers.

In still a further embodiment of the first aspect, the polymer of the first polymer layer is cross-linked, the polymer of the second polymer layer is cross-linked, or the polymers of both the first and second polymer layers are cross-linked.

In yet a further embodiment of the first aspect, the second polymer layer includes a non-melt-processible polymer including a polyimide, a poly(amide-imide), a block copolymer of a polyimide or a poly(amide-imide) or a mixture thereof.

In still yet a further embodiment of the first aspect, the consolidated polymer film further includes a third polymer layer having a third elastic modulus. The second polymer layer is positioned between the first and third polymer layers. A minor surface of the second polymer layer is in contact with a minor surface of the third polymer layer. The second and third polymer layers are bonded by consolidation, and (i) the second elastic modulus is smaller than the first elastic modulus and the third elastic modulus is greater than the second elastic modulus, or (ii) the second elastic modulus is greater than the first elastic modulus and the third elastic modulus is greater than the second elastic modulus, or (iii) the second elastic modulus is greater than the first elastic modulus and third elastic modulus smaller than the second elastic modulus. In a specific embodiment, the third polymer layer includes a polyimide, a poly(amide-imide), a block copolymer of a polyimide or a poly(amide-imide), a polycarbonate, a polyethylene naphthalate, a polystyrene, a poly(methyl methacrylate) a polyethylene terephthalate, a polyethylene terephthalate glycol, a poly cyclohexylenedimethylene terephthalate glycol, a polyether imide, a polysulfone, a polyether sulfone, a polyarylsulfone, a polyaryletherketone, a cyclic olefin copolymer, or a mixture thereof. In another specific embodiment, the third polymer layer includes a non-melt-processible polymer including a polyimide, a poly(amide-imide), a block copolymer of a polyimide or a poly(amide-imide) or a mixture thereof.

In another specific embodiment, the consolidated polymer film further includes a fourth polymer layer having a fourth elastic modulus, wherein a major surface of the fourth polymer layer is in contact with major surfaces of the first, second and third polymer layers, and the fourth polymer layer is bonded to at least one of the first, second and third polymer layers by consolidation. In a specific embodiment, the fourth polymer layer includes a non-melt-processible polymer including a polyimide, a poly(amide-imide), a block copolymer of a polyimide or a poly(amide-imide) or a mixture thereof.

In a second aspect, a cover window includes the consolidated polymer film of the first aspect and a layer of a transparent material, wherein the layer of a transparent material has a speed of sound of at least 2000 m/s.

In a third aspect, an electronic device includes the cover window of the second aspect.

In a fourth aspect, a consolidated polymer film includes a first polymer layer having a first yield strength, wherein the first polymer layer includes a non-melt-processible polymer including a polyimide, a poly(amide-imide), a block copolymer of a polyimide or a poly(amide-imide) or a mixture thereof, and a second polymer layer having a second yield strength, wherein the second polymer layer includes a polyimide, a poly(amide-imide), a block copolymer of a polyimide or a poly(amide-imide) or a mixture thereof. The first yield strength is different from the second yield strength and the first and second polymer layers are bonded by consolidation.

In one embodiment of the fourth aspect, the first and second polymer layers are substantially transparent. In a specific embodiment, the consolidated polymer film has a b* color of 2 or less for a film thickness of 50 µm or less.

In another embodiment of the fourth aspect, a difference between the yield strength of the first and second polymer layers is at least 5%.

In still another embodiment of the fourth aspect, a major surface of the first polymer layer is in contact with a major surface of the second polymer layer.

In yet another embodiment of the fourth aspect, a minor surface of the first polymer layer is in contact with a minor surface of the second polymer layer.

In still yet another embodiment of the fourth aspect, the second polymer layer includes a non-melt-processible polymer including a polyimide, a poly(amide-imide), a block copolymer of a polyimide or a poly(amide-imide) or a mixture thereof.

In a further embodiment of the fourth aspect, the consolidated polymer film further includes a third polymer layer having a third yield strength. The second polymer layer is positioned between the first and third polymer layers and the second and third polymer layers are bonded by consolidation, and (i) the second yield strength is smaller than the first yield strength and the third yield strength is greater than the second yield strength, or (ii) the second yield strength is greater than the first yield strength and the third yield strength is greater than the second yield strength, or (iii) the second yield strength is greater than the first yield strength and third yield strength smaller than the second yield strength. In a specific embodiment, the third polymer layer includes a polyimide, a poly(amide-imide), a block copolymer of a polyimide or a poly(amide-imide), a polycarbonate, a polyethylene naphthalate, a polystyrene, a poly(methyl methacrylate) a polyethylene terephthalate, a polyethylene terephthalate glycol, a poly cyclohexylenedimethylene terephthalate glycol, a polyether imide, a polysulfone, a polyether sulfone, a polyarylsulfone, a polyaryletherketone, a cyclic olefin copolymer, or a mixture thereof. In another specific embodiment, the third polymer layer includes a non-melt-processible polymer including a polyimide, a poly(amide-imide), a block copolymer of a polyimide or a poly(amide-imide) or a mixture thereof.

In a fifth aspect; a cover window includes the consolidated polymer film of the fourth aspect and a layer of a transparent material, wherein the layer of a transparent material has a speed of sound of at least 2000 m/s.

In a sixth aspect, an electronic device includes the cover window of fifth aspect.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Consolidated polymer films can be used to form foldable films. In one embodiment, a consolidated polymer film can include layers based on the same or different polymer compositions that are bonded together by consolidation. In one embodiment, useful polymer compositions for a consolidated polymer can include polyimides (PI), poly(amide-imides) (PAI), polycarbonates (PC), polyethylene naphthalates (PEN), polystyrenes (PS), poly(methyl methacrylates) (PMMA) polyethylene terephthalates (PET), polyethylene terephthalate glycols (PETG), poly cyclohexylenedimethylene terephthalate glycols (PCTG), polyether imides (PEI), polysulfones, polyether sulfones, polyarylsulfones, polyaryletherketone (PAEK) such as polyether ether ketone (PEEK) and polyetherketoneketone (PEKK), and cyclic olefin copolymers. Polyimides or poly(amide-imides) that contain aromatic monomers are typically very thermally stable and are foldable.

In one embodiment, a consolidated polymer film can include layers with different elastic moduli. By controlling the relative moduli of adjacent layers in a polymer film, a consolidated polymer film can dissipate the energy of impacts through controlled distribution of sound waves, thereby minimizing damage to the electronic components of an electronic display device. A consolidated polymer film can be designed such that the individual layers have different elastic moduli in the in-plane direction, the out-of-plane direction or both the in-plane and out-of-plane directions.

In one embodiment, a consolidated polymer film can include layers with different yield strengths. By controlling the relative yield strengths of adjacent layers in a polymer film, a consolidated polymer film can dissipate the energy of impacts through controlled distribution of sound waves, thereby minimizing damage to the electronic components of an electronic display device. A consolidated polymer film can be designed such that the individual layers have different yield strengths in the in-plane direction, the out-of-plane direction or both the in-plane and out-of-plane directions.

In one embodiment, a consolidated polymer film can include layers of block copolymers, such as polyimide block copolymers or poly(amide-imide) block copolymers. Poly (amide-imide) compositions may have higher elastic modulus than polyimide compositions due to interchain interactions. Compositions of block copolymers can be stiffer, i.e., have a higher elastic modulus, than random copolymers of the same composition. For example, a block copolymer of a polyimide can have a block containing a combination of a more rigid dianhydride and/or a more rigid diamine. In this way, the mechanical properties of the block copolymer can be manipulated relative to the other layers in the consolidated film. In one embodiment, a block copolymer of polyimides or poly(amide-imides) will be used for a layer requiring a higher elastic modulus and a polyimide will be used for a layer with a lower elastic modulus.

In one embodiment; a consolidated polymer film can include layers of non-melt processible polymers, such as polyimides, poly(amide-imides), block copolymers of polyimides or poly(amide-imides) or mixtures thereof. The term "non-melt-processible polymer" is intended to refer to a polymer resin with a melt-flow rate, or melt-flow index, that is sufficiently low, such that processing the melt to form an article, such as a film, is impractical at desirable processing temperatures. In one embodiment, a non-melt-processible polymer has a melt-flow index of less than 0.5 g/10 minutes at the melting temperature of the polymer, when measured following ISO standard 1133.

In one embodiment, the elastic modulus of a polymer layer can be increased by the presence of sub-micron fillers. In another embodiment, the elastic modulus of a polymer layer can be increased by cross-linking between the polymer chains in the polymer layer. In still another embodiment, the elastic modulus of a polyimide layer or a poly(amide-imide) layer can be increased by the introduction of an imidization catalyst into the layer during processing.

There are various embodiments of a consolidated polymer film with different numbers of layers and variations on the relative elastic moduli or yield strengths of the layers.

In one embodiment, the layers of a consolidated polymer film can be stacked on top of each other, such that the major surfaces of adjacent layers are in contact with one another and form a consolidated interface. In another embodiment, the layers of a consolidated polymer film can be arranged side-by-side, such that the minor surfaces of adjacent layers are in contact with one another and form a consolidated interface. In yet another embodiment, any number of polymer layers can be arranged in a combination of side-by-side and stacked layers that may be bonded through consolidation of any number of major and minor surface surfaces. As used herein, the term "major surface" refers to the two surfaces of a film that have the largest surface area of the film and are found on opposite sides of film. When two film layers are stacked one on top of the other, the bottom major surface of the top layer is in contact with the top major surface of the bottom layer, forming a large area interface between the two films. As used herein, the term "minor surface" refers to the surface(s) of a film that has a smaller surface area(s) than the major surfaces, commonly referred to as the film edges. For a film in which the major surfaces form a rectangular shape, there will be four minor surfaces along the edges of the film.

Those skilled in the art will appreciated that film layers can be formed in a wide range of shapes and sizes, and a single film layer can form a large number of consolidated interfaces with any number of other film layers. Furthermore, surfaces need not be coplanar or substantially planar and the two major surfaces need not be parallel to one another (e.g., a polymer layer need not have a uniform thickness throughout the layer). Finally, minor surfaces need not be perpendicular to the major surfaces. In one embodiment, some layers are not bonded by consolidation.

In one embodiment, there are three polymer layers, the first layer having a first elastic modulus, the second layer having a second elastic modulus, and the third layer having a third elastic modulus, wherein the second layer is positioned between the first layer and the third layer. In one embodiment, the layers are stacked on top of each other such that one major surface of the second layer is in contact with a major surface of the first layer and the opposite major surface of the second layer is in contact with a major surface of the third layer. In another embodiment, the layers are arranged side-by-side, such that one minor surface of the second layer is in contact with a minor surface of the first layer and the opposite minor surface of the second layer is in contact with a minor surface of the third layer.

In one three-polymer layer embodiment, the second elastic modulus is smaller than the first elastic modulus and the third elastic modulus is greater than the second elastic modulus. In one such embodiment, the first elastic modulus has been increased by the presence of sub-micron fillers in the first polymer layer, by cross-linking between the polymer chains in the first polymer layer during processing, by the introduction of an imidization catalyst into the first polymer layer during processing, or by a combination thereof. Alternatively, in other embodiments, the first polymer layer is a non-melt-processible polymer, such as a polyimide, a poly(amide-imide) or a block copolymer of polyimides or poly(amide-imides), and the second polymer layer is a non-melt-processible polymer, such as a polyimide, a poly(amide-imide) or a block copolymer of polyimides or poly(amide-imides). In another such embodiment, the elastic modulus of the third polymer layer has been increased by the presence of sub-micron fillers in the third polymer layer, by cross-linking between the polymer chains in the third polymer layer, by the introduction of an imidization catalyst into the third polymer layer, or by a combination thereof. Alternatively, in other embodiments, the third polymer layer is a non-melt-processible polymer, such as a poly(amide-imide) or a block copolymer of polyimides or poly(amide-imides). In still another such embodiment, the first elastic modulus and the third elastic modulus are essentially the same. In still another such embodiment, the first elastic modulus is greater than the third elastic modulus.

In another three-polymer layer embodiment, the second elastic modulus is smaller than the first elastic modulus and the third elastic modulus is smaller than the second elastic modulus. In one such embodiment, the first elastic modulus has been increased by the presence of sub-micron fillers in the first polymer layer, by cross-linking between the polymer chains in the first polymer layer during processing, by the introduction of an imidization catalyst into the first polymer layer during processing, or by a combination thereof. Alternatively, in other embodiments, the first polymer layer can be a non-melt-processible polymer, such as a poly(amide-imide) layer or a layer of block copolymer of polyimides or poly(amide-imides).

In still another three-polymer layer embodiment, the second elastic modulus is greater than the first elastic modulus and the third elastic modulus is greater than the second elastic modulus. In one such embodiment, the third elastic modulus has been increased by the presence of sub-micron fillers in the third polymer layer, by cross-linking between the polymer chains in the third polymer layer, by the introduction of an imidization catalyst into the third polymer layer, when it includes a polyimide, or by a combination thereof. Alternatively, in other embodiments, the third polymer layer can be a non-melt-processible polymer, such as a poly(amide-imide) layer or a layer of block copolymer of polyimides or poly(amide-imides).

In one embodiment, a difference between the elastic moduli of two adjacent layers in a consolidated polymer film is at least 5, at least 10, at least 15, at least 20, at least 25 or at least 30%. In one embodiment, the difference in the elastic moduli can be in the in-plane direction, the out-of-plane direction or both the in-plane and out-of-plane directions. In one embodiment, an elastic modulus for an individual layer, such as a tensile modulus or a transverse modulus, can be in a range of from 2 to 11 GPa, or from 4 to 8 GPa.

Even when using the same polyimide and the same amount of sub-micron fillers (submicron fillers can also be used in poly(amide-imides)), the same degree of cross-linking, the same amount of imidization catalyst, the same block copolymer of polyimides or poly(amide-imide), or the same poly(amide-imide), it is difficult to produce two layers with exactly identical elastic moduli. "Essentially identical" is used herein to describe those layers prepared with the intent and care to have the same elastic moduli.

Various other layers in the configurations described above may also have the elastic modulus increased by the presence of sub-micron fillers, by cross-linking between polymer chains, by the introduction of an imidization catalyst, or by a combination thereof.

In one embodiment, there are three polymer layers, the first layer having a first yield strength, the second layer having a second yield strength, and the third layer having a third yield strength, wherein the second layer is positioned between the first layer and the third layer. In one embodiment, the layers are stacked on top of each other such that one major surface of the second layer is in contact with a major surface of the first layer and the opposite major surface of the second layer is in contact with a major surface of the third layer. In another embodiment, the layers are arranged side-by-side, such that one minor surface of the second layer is in contact with a minor surface of the first layer and the opposite minor surface of the second layer is in contact with a minor surface of the third layer.

In one three-polymer layer embodiment, the second yield strength is smaller than the first yield strength and the third yield strength is greater than the second yield strength. In one such embodiment, the first polymer layer is a non-melt-processible polymer, such as a polyimide, a poly(amide-imide) or a block copolymer of polyimides or poly(amide-imides), and the second polymer layer is a non-melt-processible polymer, such as a polyimide, a poly(amide-imide) or a block copolymer of polyimides or poly(amide-imides). In one embodiment, the third polymer layer is a non-melt-processible polymer, such as a poly(amide-imide) or a block copolymer of polyimides or poly(amide-imides), In one embodiment, the first yield strength and the third yield strength are essentially the same. In another embodiment, the first yield strength is greater than the third yield strength.

In another three-polymer layer embodiment, the second yield strength is smaller than the first yield strength and the third yield strength is smaller than the second yield strength. In one such embodiment, the first polymer layer can be a non-melt-processible polymer, such as a poly(amide-imide) layer or a layer of block copolymer of polyimides or poly(amide-imides).

In still another three-polymer layer embodiment, the second yield strength is greater than the first yield strength and the third yield strength is greater than the second yield strength. In one such embodiment, the third polymer layer can be a non-melt-processible polymer, such as a poly(amide-imide) layer or a layer of block copolymer of polyimides or poly(amide-imides).

In one embodiment, a difference between the yield strength of two adjacent layers in a consolidated polymer film is at least 5, at least 10, at least 15, at least 20, at least 25 or at least 30%. In one embodiment, the difference in the yield strength can be in the in-plane direction, the out-of-plane direction or both the in-plane and out-of-plane directions. The polymer yield strength (yield stress and yield strain) is determined by ASTM D638. The offset yield strength measurement approximates a polymer's elastic limit. It is the stress that corresponds to a point at the intersection of two curves:

1. a stress-strain curve for the polymer, and
2. a line parallel to the specified modulus of elasticity line.

This parallel line is horizontally offset by a predetermined amount. The intersection point represents the yield point of the polymer being tested. The offset value (expressed as a strain percentage) is defined by the ASTM material testing standard. The most common offset is 0.2%. The yield stress is read from the Y-axis and the yield strain is read from the X-axis. When the material reaches its offset yield point on the stress-strain curve, it has surpassed its elastic limit and experienced a small plastic strain, approximately equivalent to the 0.2% offset value. This is defined as the 0.2% offset strain. The testing industry has accepted this standardized approach as one method to determine the yield strength of polymers that do not have an easily discernible yield point.

In one embodiment, a consolidated polymer film is substantially transparent. Transparency or transmittance in the visible (400-700 nm) or between 380 and 780 nm is necessary, A substantially transparent polymer film or layer can have a transmittance of greater than 60, 70, 80 or 90% in the visible range.

In one embodiment, the polymer films must be colorless and transparent. Transparency or high transmittance in the visible spectrum (400-700 nm), or between 380 and 780 nm, is necessary. Typical specifications require that both a* and b* are no greater than 1 color unit from neutral (0) in CIE L*, a*, b* color space coordinates. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow). For a 50 μm film, the absolute value of a* and b* should each be less than 2, or less than 1.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide manufacturing processes may be used to prepare consolidated polymer films. It would be impractical to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Useful methods for producing polyamic acid solutions include:

(a) A method wherein the diamine components and dianhydride components are preliminarily mixed together and then the mixture is added in portions to a solvent while stirring;

(b) A method wherein a solvent is added to a stirring mixture of diamine and dianhydride components, (contrary to (a) above);

(c) A method wherein diamines are exclusively dissolved in a solvent and then dianhydrides are added thereto at such a ratio as allowing to control the reaction rate;

(d) A method wherein the dianhydride components are exclusively dissolved in a solvent and then amine components are added thereto at such a ratio to allow control of the reaction rate;

(e) A method wherein the diamine components and the dianhydride components are separately dissolved in solvents and then these solutions are mixed in a reactor;

(f) A method wherein the polyamic acid with excessive amine component and another polyamic acid with excessive dianhydride component are preliminarily formed and then reacted with each other in a reactor, particularly in such a way as to create a non-random or block copolymer;

(g) A method wherein a specific portion of the amine components and the dianhydride components are first reacted and then the residual diamine components are reacted, or vice versa;

(h) A method wherein the components are added in part or in whole in any order to either part or whole of the solvent, also where part or all of any component can be added as a solution in part or all of the solvent;

(i) A method of first reacting one of the dianhydride components with one of the diamine components giving a first polyamic acid, then reacting another dianhydride component with another amine component to give a second polyamic acid, then combining the amic acids in any one of a number of ways prior to imidization.

Preparation of polyamic acid or poly(amide-amic) acid solutions can be accomplished in a similar way, except that the dianhydride can be partially replaced be an acid halide (e.g., carbonyl chloride) monomer.

In one embodiment, polyimide or poly(amide-imide) solutions can be formed by:
(a) polymerizing the dianhydride and the diamine in the presence of a first solvent to obtain a polyamic or poly(amide-amic) acid solution as described above;
(b) imidizing the polyamic acid or poly(amide-amic) acid solution to form a substantially imidized solution; and
(c) casting the substantially imidized solution to form a film.

Polyimide or poly(amide-imide) solutions can also be formed by:
(a) polymerizing the dianhydride and the diamine in the presence of a first solvent to obtain a polyamic acid solution as described above;
(b) imidizing the polyamic acid or poly(amide-amic) acid solution to form a first substantially imidized solution;
(c) precipitating the first substantially imidized solution with an antisolvent (e.g., water or alcohol);
(d) filtering and drying the first substantially imidized solution to obtain a solid polyimide resin;
(e) dissolving the solid polyimide resin in a second solvent to form a second substantially imidized solution; and
(f) casting the substantially imidized solution to form a film.

The $T_g$ values of, for example, polycarbonate, polyethylene naphthalate, polystyrene, poly(methyl methacrylate), polyethylene terephthalate (PET), polyethylene terephthalate glycol (PETG), poly cyclohexylenedimethylene terephthalate glycol (PCTG), polyether imides (PEI) polysulfones, polyether sulfones, polyarylsulfones, polyaryletherketone (PAEK) such as polyether ether ketone (PEEK) and polyetherketoneketone (PEKK), and cyclic olefin copolymers are less than 240° C. When using polyimide or poly(amide-imide) in combination with a low $T_g$ polymer, the casting solvent for the polyimide or poly(amide-imide) solution should also consist of low boiling point solvents and solvent mixtures such as acetone/methyl ethyl ketone, acetone/ethyl acetate, or ethyl acetates. Typically, the boiling point of the solvent is preferably less than about 160° C. to allow for sufficient drying of the final film without exposing the consolidated film construction to high temperature. Suitable low boiling point solvents include, but are not limited to, solvents such as acetone/methyl ethyl ketone mixtures, ethyl acetate, acetone/ethyl acetate mixtures, propyl acetate, and dimethylacetamide and other solvent combinations.

In one embodiment, first and second layers of polyimides or poly(amide-imides) can be formed on a third layer that is not a polyimide or a poly(amide-imide). Because of the low $T_g$ values of the non-polyimide or non-poly(amide-imide) third layer, the polyimide, poly(amide-imide) coating solutions for forming first and second polymer layers on a third polymer layer are preferably formed from soluble polymer compositions. In one embodiment, the polyamic acid or poly(amide-amic) acid solutions are formed and then imidized in solution to create a soluble polyimide or poly(amide-imide) solution. The polyimides or poly(amide-imides) are precipitated using an anti-solvent such as water or alcohol and subsequently re-dissolved to form a coating solution of a soluble polyimide or poly(amide-imide). The polymer solutions themselves (prior to precipitation) can also be used as coating solutions. After coating the first and second polyimide or poly(amide-imide) solutions onto the third polymer layer using techniques such as doctor blade coating, solution casting, slot die coating, spray coating or dip coating techniques, the film is dried at low temperatures (typically 250° C. or less, although brief exposure to higher temperatures may be possible) to form the final consolidated film construction.

In one embodiment, a low $T_g$ polyimide can be used for the first and second polymer layers. The $T_g$ values of the first and second polyimides, in this case, are preferably less than 240° C. Polyimide compositions containing substantial amounts of linear or branched alkyl diamines (e.g. 1,4-butanediamine, 1,5-pentane diamine, 1,6-hexanediamine) can be used to lower the $T_g$ of a polyimide system. Useful monomers for low $T_g$ polyimide composition are described in U.S. Pat. No. 7,285,321, which is incorporated herein by reference. In this case, in addition to the process described previously using a soluble polyimide coating solution, the polyamic acid solutions maybe be directly coated onto the third polymer layer (i.e., polycarbonate, polyethylene naphthalate, polystyrene, poly(methyl methacrylate), polyethylene terephthalate (PET), polyethylene terephthalate glycol (PETG), poly cyclohexylenedimethylene terephthalate glycol (PCTG), polyether imides (PEI), polysulfones, polyarylsulfones, polyether sulfones, polyaryletherketone (PAEK) such as polyether ether ketone (PEEK) and polyetherketoneketone (PEKK), or cyclic olefin copolymers) and then heated at temperatures below 240° C. to convert the polyamic acid to the polyimide.

When the $T_g$ values of the first and second polymer layers are close to the $T_g$ of the third polymer layer, the polymer layers can be consolidated using temperature and pressure. They can be consolidated in an autoclave or hot press in which heat is applied to achieve temperatures close to the $T_g$ of the polymers and pressure can be used to help consolidate the layers.

In one embodiment, the third polymer layer can be formed using a variety of film-forming techniques depending on the physical and chemical properties of the specific polymer being used. In one embodiment, a casting technique may be used. In another embodiment, an extrusion technique, such as melt-extrusion, may be used. Extrusion may be used to form a finished film or to feed a second process such as injection molding, blow molding, coating, laminating, or thereto-forming processes. In another embodiment, a blowing technique may be used. In some embodiments, films may be stretched in the machine direction (MD) and/or the transverse direction (TD) followed by flattening through nip rolls before winding the film onto a cylindrical roll. Optional post-stretching operations may include flame or corona surface treatment for wettability and sealing.

In one embodiment, for crystalline polymer resins that have clear melting points, such as PET and PEN, a non-solvent melt-extrusion technique can be used. In another embodiment, for amorphous polymers with low to moderate $T_g$ values, such as PC and PES, both melt-extrusion and solution casting techniques can be used.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred. Useful organic solvents include: N-methylpyrrolidone (NMP), dimethylacetamide (DMAc), methyl ethyl ketone (MEK), N,N'-dimethylformamide (DMF), dimethyl sulfoxide (DMSO), tetramethyl urea (TMU), diethyleneglycol diethyl ether, 1,2-dimethoxyethane (monoglyme), diethyleneglycol dimethyl ether (diglyme), 1,2-bis-(2-methoxyethoxy) ethane (triglyme), gamma-butyrolactone, and bis-(2-methoxyethyl) ether, tetrahydrofuran (THF), ethyl acetate, acetone and mixtures thereof. In one embodiment, preferred solvents include N-methylpyrrolidone (NMP) and dimethylacetamide (DMAc).

In one embodiment, an organic solvent can include an additional cosolvent. The addition co-solvent can generally be used at about 1 to 90 weight percent of the total solvent, and useful additional co-solvents include xylene, toluene, benzene, "Cellosolve™" (glycol ethyl ether), and "Cellosolve™ acetate" (hydroxyethyl acetate glycol monoacetate).

The polyimides, poly(amide-imides) and block copolymers of polyimides and poly(amide-imides) are described in terms of the diamines and dianhydrides used to form them.

Diamines

Examples of suitable diamines to form the polyimide, poly(amide-imide) and block copolymer of polyimide and poly(amide-imide) layers include p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB). 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4-diaminobiphenyl, m-amino benzoyl-p-amino anilide, 4-aminophenyl-3-aminobenzoate, N,N-bis-(4-aminophenyl) aniline; 2,4-diaminotoluene, 2-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine; and p-xylylene diamine.

Other useful diamines include 1,2-bis-(4-aminophenoxy) benzene, 1,3 bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP); 22-bis-(4-phenoxy aniline) isopropylidene, 2,4,6-trimethyl-1,3-diaminobenzene, 2,4,6-trimethyl-1,3 diaminobenzene.

In one embodiment, a suitable diamine can include a fluorinated diamine, such as 22-bis(trifluoromethyl) benzidine (TFMB), trifluoromethyl-2,4-diaminobenzene, trifluoromethyl-3,5-diaminobenzene, 2,2"-bis-(4-aminophenyl)-hexafluoro propane, 4,4-diamino-2,2'-trifluoromethyl diphenyloxide, 3,3"-diamino-5,5'-trifluoromethyl diphenyloxide, 9,9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine]; 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'('4-amino phenoxy)phenoxy]-2-[(3',5-ditrifluoro-methyl)phenyl]benzene (6FC-diamine), 3,5-diamino-4-methyl-2',3',5',6'-tetrafluoro-4'-tri-fluoromethyldi-phenyloxide, 2,2-Bis[4'(4"-aminophenoxy)phenyl]phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB).

In one embodiment, a suitable diamine for forming the polyimide film can include an aliphatic diamine, such as 1,2-diaminoethane, 1,6-diaminohexane, 1,4-diaminobutane, 1,5 diaminopentane, 1 diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, and combinations thereof. Other aliphatic diamines suitable for practicing the invention include those having six to twelve carbon atoms or a combination of longer chain and shorter chain diamines so long as both developability and flexibility are maintained. Long chain aliphatic diamines may increase flexibility.

In one embodiment, a suitable diamine for forming the polyimide film can include an alicyclic diamine (can be fully or partially saturated), such as a cyclobutane diamine (e.g., cis- and trans-1,3-diaminocyclobutane, 6-amino-3-azaspiro [3.3]heptane, and 3,6-diaminospiro[3.3]heptane), bicyclo [2.2.1]heptane-1,4-diamine, isophoronediamine, and bicyclo[2.2.2]octane-1,4 diamine. Other alicyclic diamines can include 1,4 cyclohexane diamine, 1,4-bis(aminomethyl)cyclohexane, 4,4'-methylenebis(cyclohexylamine), 4,4'-methylenebis(2-methylcyclohexylamine), bis(aminomethyl)norbornane.

Dianhydrides

In one embodiment, any number of suitable dianhydrides can be used. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3,4,4-biphenyl tetracarboxylic dianhydride (RPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4-dicarboxyphenyl) 5,6-dicarboxybenzimidazole dianhydride, 2-(3,4'-dicarboxyphenyl) 5,6-dicarboxybenzoxazole dianhydride, 2-(3,4-dicarboxyphenyl) 5,6-dicarboxybenzothiazole dianhydride, 2,2',3,3'-benzophenone tetracarboxylic dianhydride, 2,3,3',4-benzophenone tetracarboxylic dianhydride, benzophenone tetracarboxylic dianhydride (BTDA), 2,2',3,3'-biphenyl tetracarboxylic dianhydride, 2,3,3',4-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (©SDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3,4'-dicarboxydiphenylether) 1,3,4-oxadiazole dianhydride, 4,4-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride, and thiophene-2,3,4,5-tetracarboxylic dianhydride.

In one embodiment, a suitable dianhydride can include an alicyclic dianhydride, such as cyclobutane dianhydride (CBDA) cyclohexane dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic acid 1,4:2,3-dianhydride (TCA) and meso-butane-1,2,3,4-tetracarboxylic add dianhydride.

In one embodiment, a suitable dianhydride can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride. In a specific embodiment, the fluorinated dianhydride is 4,4-(hexafluoroisopropylidene)diphthalic anhydride (6FDA).

In one embodiment, the elastic modulus of a polymer layer can be increased by the presence of sub-micron fillers. The percent transmittance of the consolidated film will be a function of the refractive index difference between the filler and the polymer host and the size of the filler. Smaller differences in the refractive index between the filler and the polymer host will allow for larger dimensions of the filler without adversely affecting the transmittance of the film. The sub-micron filler can be inorganic or organic and can be present in an amount between and optionally including any two of the following percentages: 5, 10, 15, 20, 25, 30, 35, 40, and 45 volume percent of the polymer film.

Depending on the refractive index of the filler, in one embodiment the sub-micron filler can have a size of less than 550 nm in at least one dimension. In other embodiments, the filler can have a size of less than 500, less than 450, less than 400, less than 350, less than 300, less than 250, or less than 200 nm (since fillers can have a variety of shapes in any dimension and since filler shape can vary along any dimension, the "at least one dimension" is intended to be a numerical average along that dimension). The average aspect ratio of the filler can be 1 or greater. In some embodiments, the sub-micron filler is selected from a group consisting of needle-like fillers (acicular), fibrous fillers, platelet fillers, polymer fibers, and mixtures thereof. In one embodiment, the sub-micron filler is substantially non-aggregated. The sub-micron filler can be hollow, porous, or solid. In one embodiment, the sub-micron fillers of the present disclosure exhibit an aspect ratio of at least 1:1; at least 2:1, at least 4:1, at least 6:1, at least 8:1, at least 10:1, at least 12:1, or at least 15:1.

In some embodiments, sub-micron fillers are 100 nm in size or less. In some embodiments, the fillers are spherical or oblong in shape and are nanoparticles. In one embodiment, sub-micron fillers can include inorganic oxides, such as oxides of silicon, aluminum and titanium, hollow (porous) silicon oxide, antimony oxide, zirconium oxide, indium tin oxide, antimony tin oxide, mixed titanium/tin/zirconium oxides, and binary, ternary, quaternary and higher order composite oxides of one or more cations selected from silicon, titanium, aluminum, antimony, zirconium, indium, tin, zinc, niobium and tantalum. In one embodiment, nanoparticle composites (e.g. single or multiple core/shell structures) can be used, in which one oxide encapsulates another oxide in one particle.

In one embodiment, sub-micron fillers can include other ceramic compounds, such as boron nitride, aluminum nitride, ternary or higher order compounds containing boron, aluminum and nitrogen, gallium nitride, silicon nitride, aluminum nitride, zinc selenide, zinc sulfide, zinc telluride, silicon carbide, and their combinations, or higher order compounds containing multiple cations and multiple anions.

In one embodiment, solid silicon oxide nanoparticles can be produced from sols of silicon oxides (e.g., colloidal dispersions of solid silicon oxide nanoparticles in liquid media), especially sols of amorphous, semi-crystalline, and/or crystalline silica. Such sols can be prepared by a variety of techniques and in a variety of forms, which include hydrosols (i.e., where water serves as the liquid medium), organosols (i.e., where organic liquids serves as the liquid medium), and mixed sols (i.e., where the liquid medium comprises both water and an organic liquid). See, e.g., descriptions of the techniques and forms disclosed in U.S. Pat. Nos. 2,801,185, 4,522,958 and 5,648,407. In one embodiment, the nanoparticle is suspended in a polar, aprotic solvent, such as, DMAc or other solvent compatible with polyamic acid or poly(amide-amic) acid, the polyimide solution or poly(amide-imide) solution. In another embodiment, solid silicon oxide nanoparticles can be commercially obtained as colloidal dispersions or sols dispersed in polar aprotic solvents, such as for example DMAC-ST (Nissan Chemical America Corporation, Houston TX), a solid silica colloid in dimethylacetamide containing less than 0.5 percent water, with 20-21 wt % $SiO_2$, with a median nanosilica particle diameter d50 of about 20 nm.

In one embodiment, sub-micron fillers can be porous and can have pores of any shape. One example is where the pore comprises a void of lower density and low refractive index (e.g., a void containing air) formed within a shell of an oxide such as silicon oxide, i.e., a hollow silicon oxide nanoparticle. The thickness of the sub-micron fillers shell affects the strength of the sub-micron fillers. As the hollow silicon oxide particle is rendered to have reduced refractive index and increased porosity, the thickness of the shell decreases resulting in a decrease in the strength (i.e., fracture resistance) of the sub-micron fillers. Methods for producing such hollow silicon oxide nanoparticles are known, for example, as described in Japanese Patent Nos. 4406921B2 and 4031624B2. Hollow silicon oxide nanoparticles can be obtained from JGC Catalysts and Chemicals, LTD, Japan.

In one embodiment, sub-micron fillers can be coated with a coupling agent. For example, a nanoparticle can be coated with an aminosilane, phenylsilane, acrylic or methacrylic coupling agents derived from the corresponding alkoxysilanes. Trimethylsilyl surface capping agents can be introduced to the nanoparticle surface by reaction of the sub-micron fillers with hexamethyldisilazane. In one embodiment, sub-micron fillers can be coated with a dispersant. In one embodiment, sub-micron fillers can be coated with a combination of a coupling agent and a dispersant. Alternatively, the coupling agent, dispersant or a combination thereof can be incorporated directly into the polyimide film and not necessarily coated onto the sub-micron fillers.

The surface coating on an inorganic sub-micron filler will affect its refractive index. The refractive index of sub-micron fillers with a surface coating can be estimated by summing the volume fraction of the surface coating multiplied by its refractive index and the volume fraction of the inorganic core multiplied by the refractive index of the core.

In some embodiments, the sub-micron filler is chosen so that it does not itself degrade or produce off-gasses at the desired processing temperatures. Likewise, in some embodiments, the sub-micron filler is chosen so that it does not contribute to degradation of the polymer. In one embodiment, for a consolidated polymer film with outer layers on both sides of a core layer, the outer layer modulus can be increased while maintaining a softer core layer. Since there is some interdiffusion between layers, the boundary layers where there is intermixing between layers can extend over a distance of 1-2 μm or greater so that the transition in properties between adjacent layers are more gradual.

In one embodiment, the elastic modulus of a polymer layer can be increased by cross-linking between the polymer chains within the layer. The cross-linking chemistry is targeted within specific layers in which a higher elastic modulus and speed of sound is desired. Cross-linking between the polymer chains can be achieved through thermal processing or through UV-initiated chemistries.

Thermally induced cross-linking between the polymer chains can be achieved by introducing diacetylene groups into the polymer composition. These acetylene or ethylene groups can be cross-linked with other acetylene or ethylene groups, in some cases by thermally activated processes near the temperature of imidization of the film. Other approaches for thermally initiated cross-linking include the inclusion of monomers with carboxylic acid pendant groups that can decarboxylate at moderate temperatures to generate radicals that can react and form covalent bonds with entities on a neighboring polymer chain. An example of such a monomer which can be co-polymerized into the polyamic acid is 3,5 diaminobenzoic acid, which would generate an aryl radical to initiate cross-linking reactions.

Cross-linking chemistry between polymer chains can also be achieved through the incorporation of diols into the polymer backbone. One such example is 1,4-butylene glycol. In addition, the diols can react with carboxylic acid moieties on neighboring chains (such as those introduced by diaminobenzoic acid) to form an ester linkage between polymer chains.

UV-induced cross-linking reactions can also be used, and these may be performed before or after the thermal imidization step. One approach would be to incorporate DAM (2,4,6-trimethl-1,3-phenylene diamine) into the polymer backbone during the formation of the polyamic acid along with a benzophenone monomer such as BTDA (3',4,4'-benzophenonoe-tetracarboxylic dianhydride). It is postulated that the benzophenone can react with hydrogen donating moieties on a neighboring chain (such as those on the DAM monomer or another monomer with pendant hydrogen groups) through hydrogen abstraction and subsequent radical coupling between the polymer chains.

Cross-linking and branching between polymer chains can also be achieved by introducing trifunctional monomers (e.g. triamines) into the polymer backbone.

The cross-linking chemistry has a beneficial impact on the interlayer bonding. For instance, if two chemical moieties are needed for the cross-link, one could be used for the polymer composition in each layer. A thermally or UV induced cross-linking reaction can improve the bonding between layers by introducing covalent bonds between polymer chains of two neighboring layers. When incorporating cross-linking in any polymer layers of the consolidated polymer film, the layers are first bonded by consolidation, followed by cross-linking.

In one embodiment, polyimide layer properties can be adjusted by the introduction of imidization catalysts into specific layers. In general, the catalyst will lower the temperature of imidization, increase the crystallinity and increase the polyimide modulus. The concentration and type of catalyst can be used to control properties. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Some configurations may have different catalysts introduced into different layers, depending on the properties desired. For instance, for a three-layer polyimide film where the first and third layers possess an increased modulus, the catalysts can be introduced only into those two layers.

Since there is some interdiffusion of solvents between layers and between polymer surfaces, the imidization catalyst can also interdiffuse to some degree as well. This will depend on the catalyst concentration, the thickness of the layers, and the drying profile used to prepare the film. In this way, a property gradation from one layer to another can be achieved.

Adjacent polymer layers can be bonded by consolidation. Consolidation is joining by welding and eliminating interfaces rather than by adhering interfaces. The layers to be consolidated must be capable of undergoing one of two physical changes—either 1) melting and solidification, or 2) dissolving and solidification. In the case of non-melt-processible polymers, layers are consolidated through dissolving and solidification.

In the first case of melting and solidification, a method of heat transfer is furnished to raise the polymer surface temperature to soften or partially melt the layers to be subsequently consolidated together. The surfaces are then brought together under transverse normal pressure and to accomplish intimate molecular contact between the polymer surfaces. Polymer interdiffusion occurs by reptation (snake-like motion) across the interfaces, accomplishing strong bonds between the consolidated layers. Bond strengths equaling that of the parent polymer can be reached. A post-processing step might be applied.

In the second case of dissolving and solidification, solvents are used either during the original manufacturing step or following manufacturing to prepare the polymer layers to be consolidated together. The solvent partially dissolves the polymer during manufacture or by diffusing into the polymer surface. The solvent-softened surfaces are brought together under transverse normal pressure to accomplish intimate molecular contact. Polymer interdiffusion occurs across the interfaces, accomplishing strong bonds between the consolidated layers. Since the solvent reduces the polymer glass transition temperature ($T_g$), welds are formed without the applied heat that is required in other consolidation processes. As with the melting process, bond strengths equaling that of the parent material can be reached. A post-processing step might be applied.

In this process, the polyamic or poly(amide-amic) acids are either cast as polyamic or poly(amide-amic) acid layers, partially imidized polyamic or poly(amide-amic) acid layers, or soluble polyimide or poly(amide-imide) layers. These layers can be cast in a co-extrusion process that results in consolidation. In this process, the polymer chains can co-mingle; there can be co-entanglement of the polyamic or poly(amide-amic) acid layers, partially imidized polyamic or poly(amide-amic) acid layers, or soluble polyimide or poly(amide-imide) chains between neighboring layers as discussed above. There will be greater interlayer bonding than can be conventionally achieved by coating one formulation onto a second pre-formed polymer substrate. When the multi-layer is based on polyamic acid, it can be imidized in a separate step, so that the entire consolidated is cured or imidized simultaneously. If the material is co-extruded using a multicavity die with independent polyamic add solution, poly(amide-amic) acid solution, polyimide solution or poly(amide-imide) solution streams, there is also a significant manufacturing cost advantage, because the layers are formed and combined in a single or cascaded casting process (as opposed to sequentially coating one film layer on top of the other). In one embodiment, a slot die coating process can be used. In another embodiment, multiple slot dies can be slightly cascaded.

In one embodiment, the consolidated polymer film is prepared by simultaneously extruding the layers of polyamic or poly(amide-amic) acids, partially imidized polyamic or poly(amide-amic) acid layers, or soluble polyimide or poly(amide-imide) layers. In some embodiments, the layers are extruded through a single or multi-cavity extrusion die. In one embodiment, the consolidated film is produced using a single-cavity die. If a single-cavity die is used, the laminar flow of the streams should be of high enough viscosity to prevent comingling of the streams and to provide even layering. In one embodiment, the consolidated polymer film is prepared by casting from a slot die onto a moving stainless-steel belt. In a specific embodiment including a polyimide layer(s), the belt is then passed through a convective oven, to evaporate solvent and partially imidize the polymer, to produce a "green" film. The green film can be stripped off the casting belt and wound up. The green film can then be passed through a tenter oven to fully cure the polymer. In some embodiments, during tentering, shrinkage can be minimized by constraining the film along the edges (i.e. using clips or pins).

In some embodiments, layers can be formed by successive coatings of polyamic acid, poly(amide-amic) acid, soluble polyimide, or soluble poly(amide-imide). For instance, solutions of these polymers can be sequentially deposited by slot die coating, casting, or similar processes.

In some embodiments, the consolidated structure can be formed by coating a solution containing a soluble polyimide composition onto a pre-formed film of a polyimides (PI), poly(amide-imides) (PAI), polycarbonates (PC), polyethylene naphthalates (PEN), polystyrenes (PS), poly(methyl methacrylates) (PMMA) polyethylene terephthalates (PET), polyethylene terephthalate glycols (PETE), poly cyclohexylenedimethylene terephthalate glycols (PCTG), polyether imides (PEI), polysulfones, polyether sulfones, polyaryl sulfones, polyaryletherketone (PAEK) such as polyether ether ketone (PEEK) and polyetherketoneketone (PEKK), and cyclic olefin copolymers. In some embodiments, consolidation can be achieved because of the partial dissolution of one layer into another, resulting in an interphase region and consolidation of the polymers.

In one embodiment, outer layers of a consolidated polymer film can be applied to a core layer or during an intermediate manufacturing stage of film formation, such as to gel film or to green film.

In one embodiment, two polymer compositions can be formed into polymer films by a slot die coating or extrusion process using polymer solutions or polymer solution precursors. Side-by-side layers can be formed by first creating a region in which a reduced thickness region is formed. The reduced thickness profile can be achieved by coating a lane of lower thickness in the machine direction of a standard film coating process. This can be done by restricting the coating solution flow in the desired area by applying an obstruction that blocks a small percentage of the coating opening. An example of this process is a draw down coating using a coating knife with a wire to restrict flow in the desired region. An area of reduced thickness can also be created by stopping and restarting the flow after advancement of the casting support or carrier, which can be a stainless-steel belt, film, or a stage that creates a thinner portion perpendicular to the machine direction.

The reduced thickness region can also be created using a subtractive process. The base sample can be prepared with a taped area that can be coated over. The tape can be removed to remove the polymer layer to produce a low thickness area. This method would create a reduced thickness or completely deplete polymer in the affected region. Another subtractive process would involve coating a film and taping the areas where the thickness needs to be maintained. The low thickness area can then be created by a separate dissolution step in which a solvent dissolves portions of the outer layers to create the desired low thickness region. In the case where the outer layers layer is derived from a soluble polyimide or poly(amide-imide) compositions, this solvent can be DMAc, NMP, MEK, THF, or ethyl acetate or their combination.

In order to produce the side-by-side structure, the low thickness region can then be overcoated with another polymer or polymer precursor solution to create a consolidated side-by-side structure. Consolidation can occur after the coating process, or after the higher temperature drying or curing process (when using a polymer precursor).

In one embodiment, the thickness of an individual polymer layer can be in a range of from 5 to 200, from 10 to 150, or from 15 to 100 μm. In one embodiment, the thickness of an individual polymer layer can be varied. In one embodiment, the thickness of each polymer layer can be the same or different.

Also provided is a cover window for a display comprising a consolidated polymer film of the invention. The first layer of each of the various consolidated variations is the layer farthest from the display.

In an impact resistant structure such as the cover window, the velocity at which stresses propagate in a material must be high to allow dissipation of the initial kinetic energy over a large volume of the structure, and to enhance the interchange of momentum between an impactor and the target. Sound, a mechanical wave, and stresses propagate at various wave speeds in a material. Different modes of deformation result in different waves speeds (longitudinal, distortional, Rayleigh, etc.) in a material.

Herein reference to the high speed of sound layer means the speed of the longitudinal wave in the material. This is the fastest elastic wave in a material. It is common to refer to the speed of the longitudinal wave as the speed of sound in the material. For an isotropic material, the longitudinal wave speed equation is $$C_L = \sqrt{\frac{(1-v)}{(1+v)(1-2v)}\frac{E}{\rho}}$$

where,
E is the elastic modulus of the material
v is the Poisson's ratio of the material
ρ is the density of the material
In an embodiment, the interfaces in the consolidated polymer film have a Mode I interlaminar fracture toughness ($G_{Ic}$) of at least 100, at least 500, at least 1500 or at least 3000 J/m². In one embodiment, a minimum Mode I interlaminar fracture toughness ($G_{Ic}$) between any adjacent layers in a cover window is at least 100, at least 200 or at least 350 J/m². Polyimides and poly(amide-imides) typically have densities in a range of from 1.40 to 1.70 g/cm² and Poisson's ratios in a range of from 0.30 to 0.40. In one embodiment, the speed of sound in at least one layer of the consolidated polymer film is at least 1300, at least 1800, at least 2000, at least 2500, at least 3000, or at least 3500 m/s. In one embodiment, the speed of sound in at least one layer of the consolidated polymer film is in a range of from 1300 to 6000, from 2000 to 5500, from 2500 to 5500, from 3000 to 5000, or from 3500 to 4500 m/s.

In one embodiment, the cover window further comprises a layer of transparent material with a high speed of sound positioned between the consolidated polymer film and the display. In one such embodiment, the speed of sound of the transparent material with a high speed of sound is at least 2000, at least 2500 or at least 3000 m/s. In another such embodiment, the transparent material with a high speed of sound polyimide, poly(amide-imide), poly(methyl methacrylate), polyether ketone, polystyrene, polycarbonate or polyester. In still another such embodiment, the transparent material with a high speed of sound is a particle reinforced polymer.

In another embodiment, the cover window further comprises a layer of transparent material with a high speed of sound positioned above the first layer of the consolidated polymer film. In one such embodiment, the speed of sound of the transparent material with a high speed of sound is at least 2000, at least 2500 or at least 3000 m/s. In another such embodiment, the transparent material with a high speed of sound is polyimide, poly(amide-imide), poly(methyl methacrylate), polyether ketone, polystyrene, polycarbonate or polyester. In still another such embodiment, the transparent material with a high speed of sound is a particle reinforced polymer.

In another embodiment, the cover window further comprises two layers of transparent material with a high speed of sound, one layer positioned between the consolidated polymer film and the display and one layer positioned above the first layer of the consolidated polymer film. In one such embodiment, the speed of sound of the transparent material with a high speed of sound is at least 2000, at least 2500 or at least 3000 m/s. In another such embodiment, the transparent material with a high speed of sound is polyimide, poly(amide-imide), poly(methyl methacrylate), polyether ketone, polystyrene, polycarbonate or polyester. In still another such embodiment, the transparent material with a high speed of sound is a particle reinforced polymer.

In one embodiment, a cover window further comprises an adhesive layer, such as an epoxy adhesive, an acrylic adhesive or a urethane adhesive.

In one embodiment, a cover window can include more than one consolidated polymer film. For instance, in one embodiment, a cover window can include a first consolidated polymer film, a first adhesive, a layer of transparent material with a high speed of sound, a second adhesive and a second consolidated polymer film. In another embodiment, a cover window can include a first layer of transparent material with a high speed of sound, a first consolidated polymer film, and second layer of transparent material with a high speed of sound, an adhesive, a third layer of a transparent material with a high speed of sound and a second consolidated polymer film. Those skilled in the art will understand that any number of cover window designs can be provided based on an understanding of the properties of the different layers as described in the present invention.

Test Methods

Elastic Modulus

The polymer film elastic moduli can be measured two ways. The in-plane elastic modulus is measured using the ASTM D882 test method. The out-of-plane elastic modulus is measured using a nanoindenter specially configured to measure film stiffness. A nanoindenter (Hysitron TI 980 TriboIndenter, Bruker, Minneapolis, MN) is used to characterize the film indentation modulus in compression. The nanoindenter has load and displacement resolutions of 1 nN and 0.04 nm, respectively, and is operated in continuous stiffness mode whereby the indenter tip is continuously oscillated at a 1-2 nm amplitude for improved surface detection and extraction from a single measurement of mechanical properties as a function of indentation depth. A standard Berkovich tip is used for the indentations. The indicated films are mounted on sample holders using an adhesive, Indentations are made on each coating in at least six different locations once the test system has reached a thermal drift of ~0.1-0.2 nm/sec, Subsequent to the measurement, three to five indentations are made on the specimen to verify the previous calibration. Since nanoindentation measures a constrained compression modulus, that is, transverse modulus with some in-plane modulus contribution, the transverse modulus is backed out of the measurement with a finite element model of the test in combination with knowledge of the in-plane modulus.

Yield Strength

The polymer yield strength (yield stress and yield strain) is determined by ASTM D638.

Interlaminar Fracture Toughness in Mode I ($G_{Ic}$)

Interfacial bond strength can be measured with a double-cantilever beam test. The test uses a 1"×6" consolidated film specimen. This 'A'layer/'B" layer/'A' layer specimen is adhered top and bottom with 1"×6" aluminum backing bars to limit the sample deflection under load, and to attach to loading blocks. The result is a sandwich as follows: AI bar/'A' Layer/'B' layer/AI bar. Then, loading blocks are attached to the aluminum backing bars top and bottom. The samples are tested in an ElectroForce 1000 load frame equipped with a 1000 lb load cell. The test purposefully creates an initial crack between the weakest layers and propagates that crack along the interface while measuring the transverse load, the opening displacement, and the crack length along the specimen long axis. If the crack can be easily created, the interfacial adhesion is low or modest and $G_{Ic}$ can be measured. If the crack cannot be created, the interlaminar adhesion is high, or is not adhesion at all, but instead consolidation. A fully consolidated tri-layer stack should not be able to be separated. The locus of failure should be elsewhere.

Optical Properties

Optical properties of the multi-layer polymeric protective sheet (transmittance, haze, yellow index and b*) can be measured with a BYK Haze Gard Plus instrument (commercially available from BYK-Gardner GmbH, Germany), Yellow index can be calculated based on the absorbance spectrum between 395 and 700 nm using a PerkinElmer Lamba 550-UV spectrometer (commercially available from PerkinElmer Inc., Waltham, MA). b* (which correlates to the perceived degree of yellowing) can be calculated based on % Transmittance between 380 to 780 nm, with 10 degree viewing angle and D65 daylight illuminant.

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims,

What is claimed is:

1. A consolidated polymer film comprising:
a first polymer layer having a first elastic modulus, wherein the first polymer layer comprises a non-melt-processible polymer comprising a polyimide, a poly(amide-imide), a block copolymer of a polyimide or a poly(amide-imide) or a mixture thereof; and
a second polymer layer having a second elastic modulus, wherein the second polymer layer comprises a polyimide, a poly(amide-imide), a block copolymer of a polyimide or a poly(amide-imide) or a mixture thereof, wherein:
a minor surface of the first polymer layer is in contact with a minor surface of the second polymer layer;
the first elastic modulus is different from the second elastic modulus;
the first and second polymer layers are bonded by consolidation; the first and second polymer layers each have a transmittance of greater than 60% in the visible range; and the consolidated polymer film has a b* color of 2 or less for a film thickness of 50 μm or less.

2. The consolidated polymer film of claim 1, wherein a Mode I interlaminar fracture toughness ($G_{Ic}$) between the first and second polymer layers is at least 500 J/m².

3. The consolidated polymer film of claim 1, wherein the elastic modulus of the first polymer layer is in a range of from 2 to 11 GPa.

4. The consolidated polymer film of claim 1, wherein a difference between the elastic moduli of the first and second polymer layers is at least 5%.

5. The consolidated polymer film of claim 1, wherein the first polymer layer, the second polymer layer, or both the first and second polymer layers have a speed of sound of at least 1300 m/s.

6. The consolidated polymer film of claim 1, wherein the first polymer layer, the second polymer layer, or both the first and second polymer layers further comprise sub-micron fillers.

7. The consolidated polymer film of claim 1, wherein the polymer of the first polymer layer is cross-linked, the polymer of the second polymer layer is cross-linked, or the polymers of both the first and second polymer layers are cross-linked.

8. The consolidated polymer film of claim 1, wherein the second polymer layer comprises a non-melt-processible polymer comprising a polyimide, a poly(amide-imide), a block copolymer of a polyimide or a poly(amide-imide) or a mixture thereof.

9. The consolidated polymer film of claim 1, further comprising a third polymer layer having a third elastic modulus, wherein:
   the second polymer layer is positioned between the first and third polymer layers;
   a minor surface of the second polymer layer is in contact with a minor surface of the third polymer layer;
   the second and third polymer layers are bonded by consolidation; and
   (i) the second elastic modulus is smaller than the first elastic modulus and the third elastic modulus is greater than the second elastic modulus, or (ii) the second elastic modulus is greater than the first elastic modulus and the third elastic modulus is greater than the second elastic modulus, or (iii) the second elastic modulus is greater than the first elastic modulus and third elastic modulus smaller than the second elastic modulus.

10. The consolidated polymer film of claim 9, wherein the third polymer layer comprises a polyimide, a poly(amide-imide), a block copolymer of a polyimide or a poly(amide-imide), a polycarbonate, a polyethylene naphthalate, a polystyrene, a poly(methyl methacrylate) a polyethylene terephthalate, a polyethylene terephthalate glycol, a poly cyclohexylenedimethylene terephthalate glycol, a polyether imide, a polysulfone, a polyether sulfone, a polyarylsulfone, a polyaryletherketone, a cyclic olefin copolymer, or a mixture thereof.

11. The consolidated polymer film of claim 9, wherein the third polymer layer comprises a non-melt-processible polymer comprising a polyimide, a poly(amide-imide), a block copolymer of a polyimide or a poly(amide-imide) or a mixture thereof.

12. The consolidated polymer film of claim 9, further comprising a fourth polymer layer having a fourth elastic modulus, wherein a major surface of the fourth polymer layer is in contact with major surfaces of the first, second and third polymer layers, and the fourth polymer layer is bonded to at least one of the first, second and third polymer layers by consolidation.

13. The consolidated polymer film of claim 9, wherein the fourth polymer layer comprises a non-melt-processible polymer comprising a polyimide, a poly(amide-imide), a block copolymer of a polyimide or a poly(amide-imide) or a mixture thereof.

14. A consolidated polymer film comprising:
   a first polymer layer having a first yield strength, wherein the first polymer layer comprises a non-melt-processible polymer comprising a polyimide, a poly(amide-imide), a block copolymer of a polyimide or a poly(amide-imide) or a mixture thereof; and
   a second polymer layer having a second yield strength, wherein the second polymer layer comprises a polyimide, a poly(amide-imide), a block copolymer of a polyimide or a poly(amide-imide) or a mixture thereof, wherein:
   a minor surface of the first polymer layer is in contact with a minor surface of the second polymer layer;
   the first yield strength is different from the second yield strength;
   the first and second polymer layers are bonded by consolidation; the first and second polymer layers each have a transmittance of greater than 60% in the visible range; and the consolidated polymer film has a b* color of 2 or less for a film thickness of 50 µm or less.

15. The consolidated polymer film of claim 14, wherein a difference between the yield strength of the first and second polymer layers is at least 5%.

\* \* \* \* \*